United States Patent
Rounsaville

[11] 3,820,971
[45] June 28, 1974

[54] FERTILIZER COMPOSITION AND PROCESS

[76] Inventor: James F. Rounsaville, 1007 S. 9th St., Ponca City, Okla. 74601

[22] Filed: Feb. 22, 1971

[21] Appl. No.: 117,767

Related U.S. Application Data

[63] Continuation of Ser. No. 755,084, Aug. 26, 1968, abandoned.

[52] U.S. Cl............................ 71/35, 71/50, 71/61
[51] Int. Cl............................................ C05b 21/00
[58] Field of Search............. 71/34, 35, 40, 50, 51, 71/59, 64, 64 DA, 64 DB

[56] References Cited
UNITED STATES PATENTS
3,268,325  8/1966  Lyon.................................... 71/64

OTHER PUBLICATIONS

Madensky, et al., Industrial & Engineering Chemistry, "Potassium Metaphosphate A Potential High–Analysis Fertilizer Material," Vol. 32, No. 2, pp. 244–248.

Primary Examiner—Charles N. Hart
Attorney, Agent, or Firm—Richards, Harris & Medlock

[57] ABSTRACT

A novel melt fertilizer comprising potassium metaphosphate and ammonium nitrate, wherein a chloride-free $KPO_3$ can be derived from wet process phosphoric acid and potassium chloride; other nutrient salts can be incorporated in the melt.

5 Claims, 1 Drawing Figure

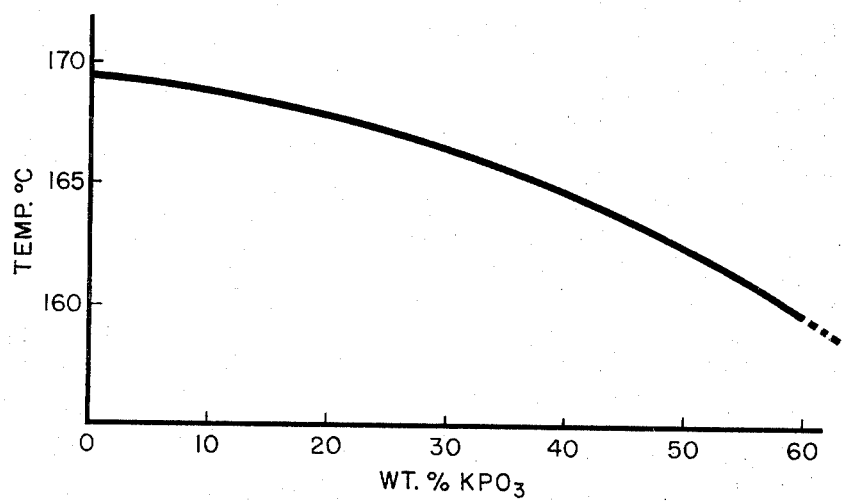
INVENTOR.
JAMES F. ROUNSAVILLE
BY
ATTORNEY

FERTILIZER COMPOSITION AND PROCESS

This application is a continuation of Ser. No. 755,084, filed Aug. 26, 1968, and now abandoned.

This invention relates to a novel fertilizer composition, and to a method for manufacturing same.

Nitrogen, phosphorus and potassium are well recognized as the three basic plant nutrient elements. Most fertilizers which include all three of these elements comprise a physical admixture of several salts, and are thus subject to non-uniformity. Nitrogen is typically applied in the form of urea, nitrates or ammonia, while phosphorus is generally used in the form of phosphate salts. Potassium is less conveniently available, in that it occurs widely as potassium chloride, e.g. sylvite, and chloride ion is detrimental to many crops.

It is an object of this invention to provide a novel fertilizer composition containing at least the nutrients N, P and K. Another object of the invention is to provide a method for preparing such a fertilizer having high nutrient analysis, good physical characteristics, and a flexibility of grade, using commonly available feed materials.

Other aspects, objects, and the several advantages of the invention will become apparent upon study of this disclosure, the appended claims, and the drawing, in which:

The sole FIGURE represents the phase diagram for the binary system $KPO_3$-$NH_4NO_3$.

According to the invention, it has been discovered that large amounts of both potassium and phosphorus, in the form of potassium methaphosphate $KPO_3$, can be incorporated in ammonium nitrate by dissolving the $KPO_3$ in molten ammonium nitrate. It has further been discovered that fertilizers based on such molten mixtures can be formulated using common starting materials, including wet-process phosphoric acid and potassium chloride, and that the resulting fertilizer is relatively chloride-free.

Referring now to the drawing, the FIGURE illustrates a portion of the phase diagram of the binary system $KPO_3$—$NH_4NO_3$. As can be seen, the $KPO_3$ is soluble in molten ammonium nitrate up to about 60 weight percent, with the melt temperature being gradually decreased from about 169° to about 160°C. Two-component compositions of the desired concentration can be prepared by simply heating a mixture of the two solids, in appropriate amounts, to above the melting point, and then cooling to below about 160°C; the molten mixture can be prilled, granulated, or otherwise treated prior to cooling. Such a two-component mixture will contain the following nutrient values, assuming pure feed components, where $y$ is the weight fraction of $KPO_3$ and $0 < Y < 0.6$: $\%N = 35(1-y)$, $\%P_2O_5 = 60y$, and $\%K_2O = 40y$. Other salts of fertilizer value can be dissolved or suspended in the binary melt to adjust the nutrient ratios, and the melt subsequently processed into suitable fertilizer form, although of course the equations just given for nutrient value content will not be valid in such instances.

Although large concentrations of phosphates have previously been incorporated in $NH_4NO_3$ melts, it has not till now been possible to simultaneously dissolve large concentrations of potassium and phosphate in such a melt. For example, at 170°C, only 16 weight percent of potassium nitrate or 21 weight percent of potassium dihydrogen phosphate can be dissolved in molten ammonium nitrate. Furthermore, some compounds which appear to be particularly rich in potassiun, e.g. $K_3PO_4$, $K_4P_2O_7$, and $K_2HPO_4$, not only are not extensively soluble, but also act as bases to cause the loss of ammonia from the melt. Similar binary melts were prepared using $KPO_3$ and urea, but the resulting solids had poor physical properties; they were softer and more hygroscopic. This results in poor storage characteristics. Solids based on the $KPO_3$-$NH_4NO_3$ binary system have high nutrient analysis, hardness, absence of chloride, intimately mixed components, and satisfactory agronomic availability. The melt viscosity is fairly low when the $KPO_3$ content is kept below 60 weight percent, and no drying of the product is required.

One suitable source of $KPO_3$ is the dehydration of monopotassium phosphate, $KH_2PO_4$, which can be effected, e.g. at 550°C, in about an hour or less. The monopotassium phosphate can in turn be prepared by reaction of commercial merchant grade (ca. 50–54% $P_2O_5$) on potassium chloride; heating the mixture under slight vacuum results in a gummy solid, which can in turn be dehydrated as noted. A melt according to the present invention was made from 50% ammonium nitrate and 50% $KPO_3$ derived from merchant acid and $KCl$ in the manner just described, and the melt product was analyzed for impurity and nutrient levels. These are given below:

| Substance | Amount, % | Method |
|---|---|---|
| Total $P_2O_5$ | 30.0 | wet chemistry |
| Citrate soluble $P_2O_5$ | 25.9 | wet chemistry |
| Fe | 0.61 | atomic absorption |
| Al | 0.48 | atomic absorption |
| F | 0.03 | wet chemistry |
| Cl | None | x-ray fluorescence |
| Ca | None | x-ray fluorescence |
| S | None | x-ray fluorescence |

This demonstrates the valuable property of making a chloride-free melt fertilizer from potassium chloride.

As previously stated, other fertilizer nutrient salts can be dissolved in the binary melt. Solubilities of other representative salts in a 50—50 melt at 170°C, and for comparative purposes their solubilities in pure ammonium nitrate, are given below:

| Salt | $NH_4NO_3$-$KPO_3$ | $NH_4NO_3$ |
|---|---|---|
| $NH_4H_2PO_4$ | 25 | 50 |
| $KH_2PO_4$ | 15 | 21 |
| $KNO_3$ | 10 | 16 |
| $KCl$ | reacts[a] | 16 |
| Ammonium Polyphosphate[b] | Completely miscible | Completely miscible |

[a] $KCl$ accelerates decomposition of $NH_4NO_3$ in the presence of $KPO_3$
[b] TVA's 16.0–61.6–0 from furnace acid Addition of $KPO_3$ appears to depress the solubilities of most salts in ammonium nitrate. However, the solubilities of other salts are sufficient for adjustment of the fertilizer grade.

The invention will now be further illustrated by the following additional examples.

EXAMPLE 1

One hundred and fifty parts of $KPO_3$ are dispersed in 100 parts of molten $NH_4NO_3$. The resulting dispersion is sprayed on a Stengel belt. The solids have a grade of 14–36–24 and are about as deliquescent as $NH_4NO_3$.

EXAMPLE 2

One hundred parts of $KPO_3$ are dispersed in 100 parts of molten $NH_4NO_3$. The resulting mixture is prilled to give hard pellets with good storage properties. The resulting fertilizer has a grade of 17.5–30–20.

EXAMPLE 3

Two hundred and thirty parts of the solid fertilizer from Example 2 are dissolved in 100 parts of water. To this solution 0.2 parts of an agar-based suspending agent are added to give a white opaque suspension fertilizer. The grade of this fertilizer is 12–21–14.

EXAMPLE 4

Twenty-five parts of $KPO_3$ are added to 100 parts of molten $NH_4NO_3$. The melt is prilled to give a solid with grade 28–12–18.

EXAMPLE 5

Thirty-two parts of $NH_4H_2PO_4$ and 98 parts of $KPO_3$ are dissolved in 100 parts of $NH_4NO_3$. The product is prilled to give a solid with grade 17–34–17. This product has a higher fraction of water soluble $P_2O_5$ than the other examples because of the addition of $NH_4H_2PO_4$.

Although this invention has been described with respect to particular embodiments thereof, it is not to be so limited, as changes and modifications may be made therein which are within the spirit and scope of the invention as defined by the appended claims.

What is claimed is:

1. A composition comprising a solid solution containing at least ammonium nitrate and at most about 60 weight percent potassium metaphosphate.

2. The composition of claim 1 further including a salt selected from monoammonium phosphate, monopotassium phosphate, potassium nitrate, and ammonium polyphosphate.

3. The composition of claim 2 wherein the ammonium nitrate and potassium metaphosphate are present in about equal weight proportions.

4. The method of producing a homogeneous fertilizer composition which comprises:
   a. reacting potassium chloride with phosphoric acid in about equi-molar proportion,
   b. dehydrating the resulting mixture to produce potassium metaphosphate,
   c. adding thereto ammonium nitrate in amount of at least about 67 weight percent based on said potassium metaphosphate in a manner such that the resultant material has a temperature of at least about 160°C and comprises a melt, and
   d. cooling and particulating said melt to form discrete homogeneous granules.

5. The method of claim 4 wherein there is further added, during step (c), an additional salt selected from the group consisting of monoammonium phosphate, monopotassium phosphate, potassium nitrate, and ammonium polyphosphate.

* * * * *